United States Patent [19]

Molnar et al.

[11] Patent Number: 4,576,414
[45] Date of Patent: Mar. 18, 1986

[54] SEAT BELT APPARATUS

[75] Inventors: John Molnar, Aurora; Robert B. Porter, Jr., Elburn, both of Ill.

[73] Assignee: Caterpiller Tractor Co., Peoria, Ill.

[21] Appl. No.: 574,793

[22] Filed: Jan. 27, 1984

[51] Int. Cl.$^4$ .............................................. B60R 21/10
[52] U.S. Cl. ..................................... 297/476; 24/640; 297/468
[58] Field of Search .............................. 297/476, 468; 242/107.4 R; 24/170, 641, 640

[56] References Cited

U.S. PATENT DOCUMENTS

| | | | |
|---|---|---|---|
| 3,323,832 | 6/1967 | Kirkpatrick | 297/388 |
| 3,341,250 | 9/1967 | Rasmussen | 297/476 |
| 3,891,273 | 6/1975 | Takada | 297/476 |
| 4,301,576 | 11/1981 | Cunningham | 24/640 X |
| 4,305,618 | 12/1981 | Molnar | 297/476 |
| 4,375,714 | 3/1983 | Korger | 24/640 |

Primary Examiner—James T. McCall
Attorney, Agent, or Firm—William C. Perry

[57] ABSTRACT

Many seat belt configurations have incorporated a belt retraction device into the design of the seat belt apparatus. When the retraction device includes a recoil spool that is housed within the buckle member the function of the buckle member becomes compounded. In order to release the seat belt buckle the operator is often required to move the release handle in a manner that necessitates the use of both his hands. The seat belt apparatus of the present invention provides a buckle member that is moved toward a tongue member to achieve a latching engagement between the two. A latch release member is provided within the buckle housing and is movable in a direction away from the tongue member to release the connection therebetween. This direction of movement is the same as the direction of separation between the buckle member and the tongue. Both operations may be accomplished in one motion and require the use of only one hand.

17 Claims, 5 Drawing Figures

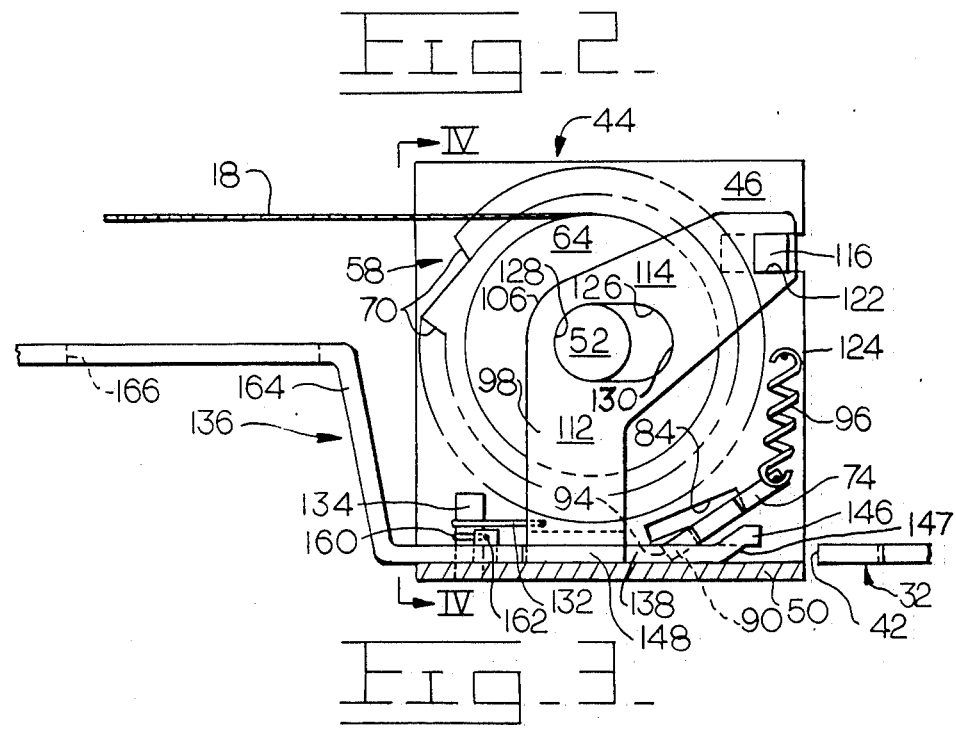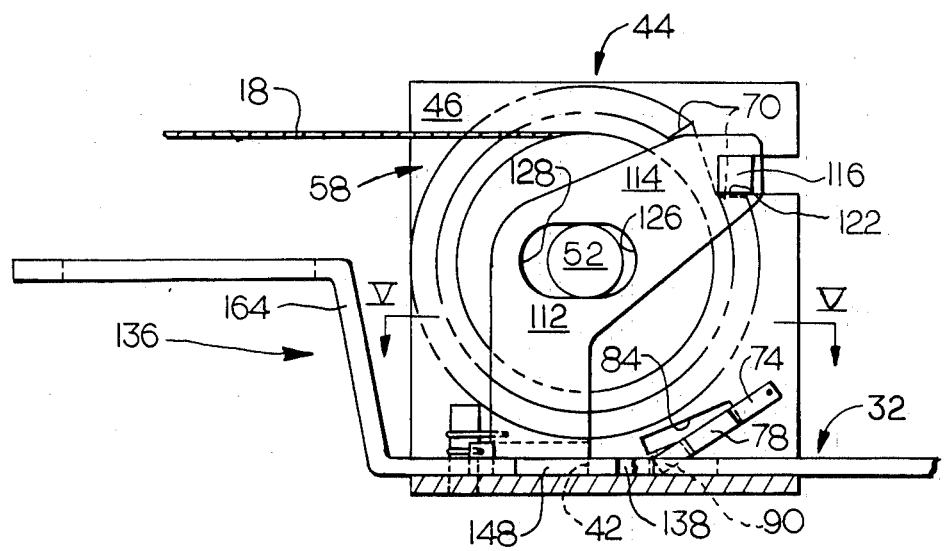

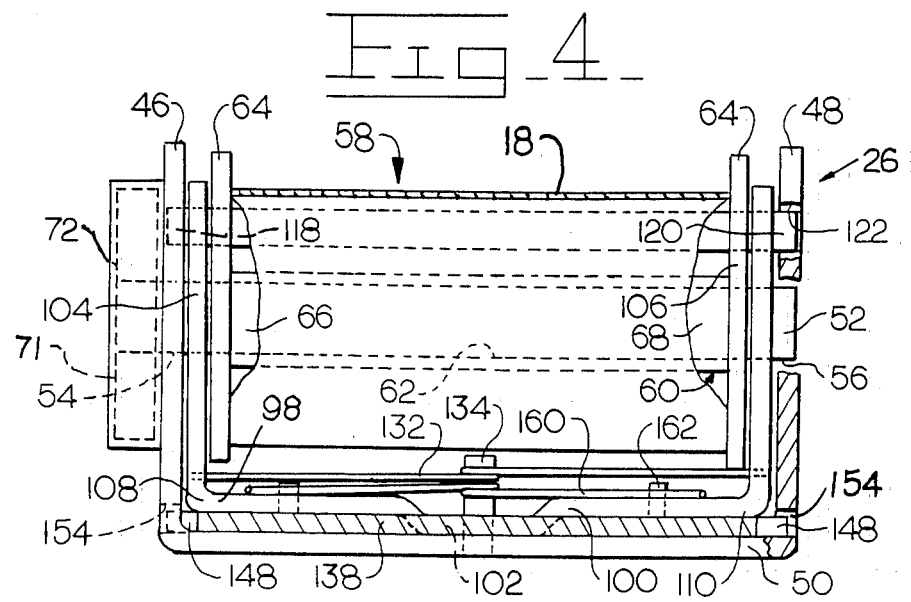
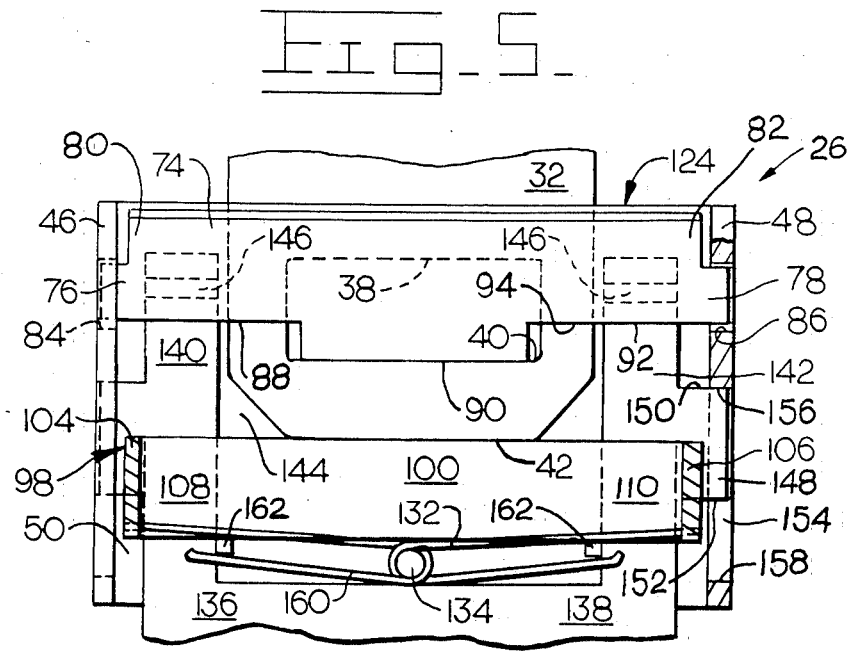

SEAT BELT APPARATUS

DESCRIPTION

1. Technical Field

This invention relates to seat belts and more particularly to the buckle construction of a seat belt.

2. Background Art

Seat belt designs of recent years have often included a retraction mechanism for one or both of the belt members to keep them wound around a recoil spool. The retraction mechanism serves to keep the belt from lying loosely on the floorboard or seat of a vehicle when not in use. In doing so, the belt is not exposed to dirt and other elements such as sunlight that may have a deleterious effect on the mechanical function or the fabric of the seat belt.

The retraction mechanism normally consists of a recoil spool that is associated with a seat belt having an adjustable length. The recoil spool is biased by a spiral, clock-type spring, or the like, to continually urge the spool to wind the belt therearound when the belt is not in use. The retractor mechanisms have been known to be mounted on the frame of a vehicle seat or within the buckle member. When mounted within the belt buckle, rotation of the recoil spool is prevented to establish the appropriate length of the seat belt that is needed to properly encompass an operator. This is accomplished by bringing a pawl member into engagement with the recoil spool to prevent its rotation. This usually occurs upon engagement of the belt buckle with the tongue of a cooperating belt that is mounted on the opposite side of the seat. This belt is usually of a fixed length so that adjustment of only one belt is necessary to attain a proper adjusted length.

One drawback that is often encountered with a retraction mechanism of this type resides in the latching and more particularly in the unlatching of the belt buckle. The unlatching function includes the release of the tongue of the cooperating belt from the buckle as well as the release of the pawl from engagement with the recoil spool. As a result, the unlatching function is often such that requires both hands of the operator.

Two typical designs are disclosed in U.S. Pat. No. 3,323,832 issued to G. A. Kirkpatrick on June 6, 1967 and U.S. Pat. No. 3,341,250 issued to B. A. Rasmussen on Sept. 12, 1967. In both patents, release of the tongue from the buckle is accomplished by the movement of a lever-type, pivoting release handle. The movement of the release handle occurs in the direction generally toward the belt that mounts the tongue member. This direction of movement is opposite the direction of rotational bias applied to the recoil spool. As a result, the biasing force of the recoil spool is rendered ineffective as a means to urge the buckle away from the tongue upon actuation of the release handle. The operator must then grasp the buckle housing in one hand, actuate the release handle with the other hand and then, while holding the handle in the released position, move the buckle away from the tongue until the two are separated. At this point, the biasing force of the recoil may then take over and wind the free end of the belt upon the spool. This procedure has normally proven to be an inconvenience and is especially so if the vehicle is being operated in an extremely cold climate and the operator is required to wear arctic mittens.

The present invention is directed to overcoming one or more of the problems set forth above.

DISCLOSURE OF THE INVENTION

In one aspect of the present invention a seat belt is adapted for use with a seat in which a first belt portion is anchored to a first side of the seat and a second belt portion is anchored to a second side of the seat assembly. A tongue is associated with a free end of the second belt portion and a buckle having a recoil spool mounted therein is associated with the free end of the first belt portion in a manner to wind the free end of the first belt portion around the recoil spool. The buckle is movable toward the tongue for engagement of the tongue within the buckle. A latch is mounted on the buckle which is positionable for holding the tongue within the buckle. A latch release is mounted on the buckle and is movable in a direction away from the tongue to release the latch from engagement with the tongue and to move the buckle away from the tongue in a single motion.

A seat belt having a latch release mechanism as described above enables an operator to grasp the latch release in just one hand to cause the unfastening of the seat belt.

BRIEF DESCRIPTION OF THE DRAWINGS

FIGS. 2 and 3 are side views of the buckle member of the present invention, shown in partial section to disclose two different modes of operation;

FIG. 4 is a section view taken along lines IV—IV of FIG. 2; and

FIG. 5 is a section view taken along lines V—V of FIG. 3.

BEST MODE FOR CARRYING OUT THE INVENTION

Figure 1:
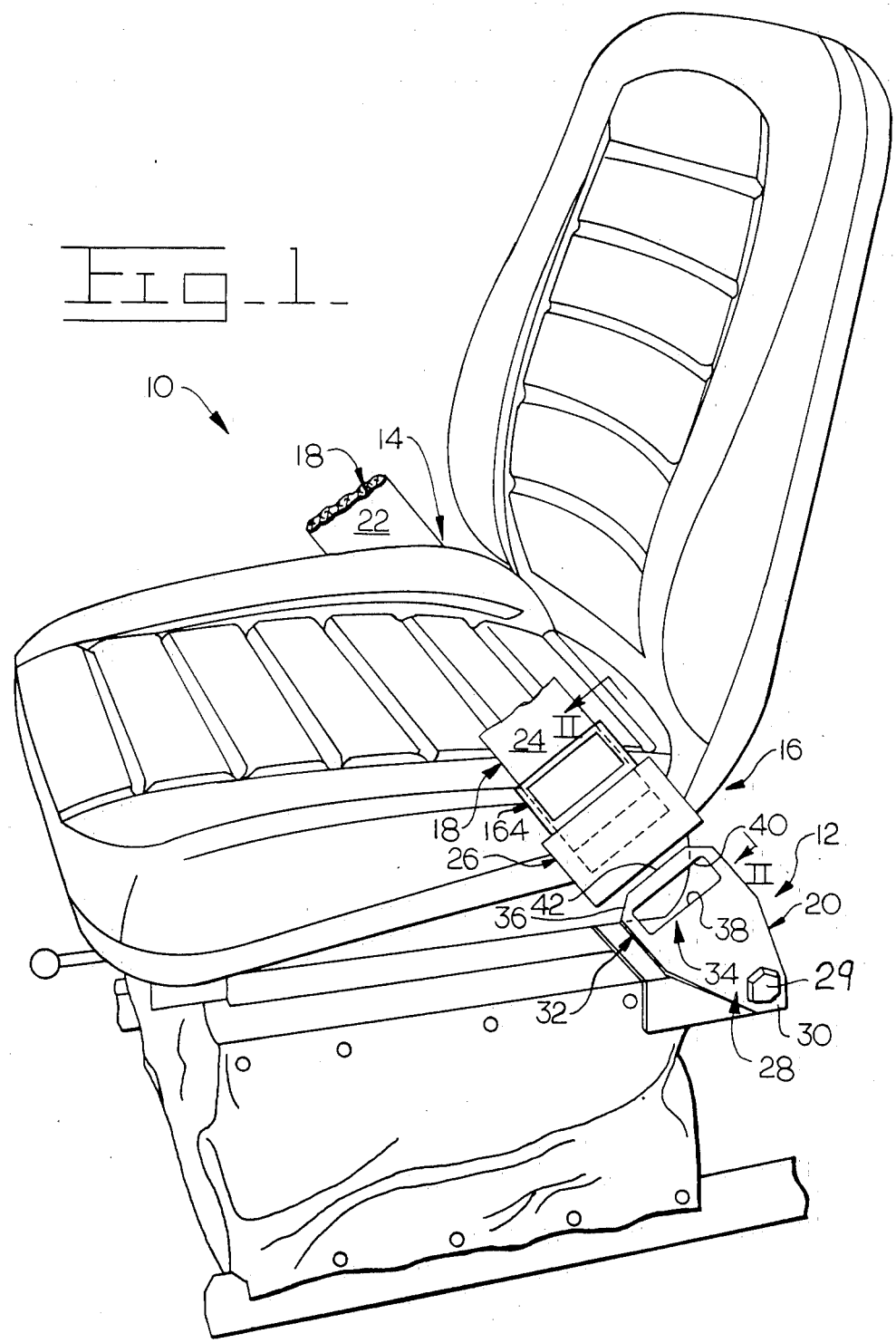
FIG. 1 is a perspective view of a seat assembly which embodies a seat belt apparatus of the present invention.

Referring now to the drawings, FIG. 1 discloses a seat assembly 10 that is normally anchored to the frame of a vehicle (not shown). A seat belt apparatus, shown generally at 12, extends from a first side 14 of the seat assembly to a second side 16 thereof to encompass an operator as he sits in the seat. The seat belt includes two belt portions 18 and 20. The first belt portion 18 has a first end portion 22 that is anchored to the first side 14 of the seat assembly. A second end portion 24 of the first belt 18 is mounted to a buckle member 26 in a manner to be described hereinafter. The second belt portion may be formed of a solid plate 28 that has a first end portion 30 anchored to the second side of the seat assembly by a bolt 29. A tongue member 32 is formed on a second end 34 of belt portion 20 and defines a tapered end portion 36. An aperture 38 is positioned through the tongue member and forms a forward wall 40 that is spaced from a leading edge 42 of the tapered surface 36 a predetermined distance. While the tongue is shown as a single plate, it could also be comprised of a flexible belt member that is attached to a plate-like tongue on one end and anchored to the second side 16 of the seat assembly on the other end. Often times a belt of this type is encased in a plastic sheathing or the like to achieve a degree of stiffness. The stiffness in the belt member tends to aid in the engagement of the buckle member 26 with the tongue member 32.

As best shown in FIGS. 2-5, the buckle member 26 includes a housing 44 which has a pair of upstanding sidewalls 46 and 48 and a guide plate 50 that extends between the sidewalls. A shaft 52 is positioned to extend between the sidewalls 46 and 48 of the buckle housing. The shaft is connected to the sidewalls 46 and 48 respectively at its opposite ends 54 and 56 (FIG. 4) to mount a recoil spool 58 thereon. The recoil spool 58 has a cylindrical portion 60 that defines a bore 62 that extends the length of the cylindrical portion to receive the shaft therein. An enlarged ratchet wheel 64 is attached to each end 66 and 68 of the cylindrical portion and a plurality of teeth 70 are formed on the outer periphery of each ratchet wheel. A spring 71 in the form of a clock-type, spiral spring is contained in a spring housing 72 and is mounted between the buckle sidewall 46 and the recoil spool 58. The spring provides a rotational bias to the recoil spool in a clockwise direction as viewed in FIG. 2. The second end 24 of the first belt 18 is engaged with the cylindrical portion 60 and the bias of the recoil spring tends to wind the first belt around the recoil spool 58.

A latch member 74 in the form of a generally flat plate is mounted within the buckle housing 44 and is best shown in FIGS. 2, 3, and 5. A pair of tabs 76 and 78 are formed on opposite ends 80 and 82 of the latch plate. The tabs are positioned in a first pair of slots 84 and 86 formed in the respective sidewalls 46 and 48 of the buckle housing 44. The slots 84 and 86 are somewhat larger than the tabs 76 and 78 and serve to capture the tabs in such a manner to allow limited movement of the latch plate with respect to the sidewalls. A plurality of abutment tangs 88, 90 and 92 are formed on the rearwardly facing edge 94 of the latch plate. The abutment tangs are normally biased toward the guide plate 50 of the buckle housing 44 by a spring 96 which extends between the latch plate and the buckle housing.

A pawl member 98 which is shown in FIGS. 2-5 has a crossmember 100 that forms an offset portion 102 along its midsection. A pair of sidewalls 104 and 106 extend upwardly from opposite ends 108 and 110 of the crossmember as viewed in the Figs. As best seen in FIGS. 2 and 3, a first portion 112 of the sidewalls extends perpendicularly to the crossmember. A second portion 114 of the sidewalls 104,106 extend from the first portion 112 at an upwardly and forwardly extending angle. A bar member 116 is rigidly connected to the second sidewall portions at a location spaced inwardly from a first and second end portion 118 and 120 of the bar 116. The bar is connected to the pawl so as to be positioned in close proximity with the ratchet wheels 64 of the recoil spool 58. The ends 118 and 120 of the bar extend laterally past the sidewalls 104 and 106 a sufficient distance to reside within a second slot 122 that is formed in each of the sidewalls 46 and 48 of the buckle housing 44. Each of the slots 122 open onto a forward portion 124 of the buckle housing and extend in a fore and aft direction to allow a limited amount of fore and aft movement of the bar with respect to the buckle housing. An oblong opening 126 is positioned in each of the sidewalls 104,106 of the pawl member 98 approximately at the juncture between the first and second wall portions 112,114. The opening 126 is large enough to receive the shaft 52 of the buckle housing 44 therein and to allow a limited amount of fore and aft movement of the pawl member with respect to the shaft. The opening defines a first edge portion 128 on the rearward side of the shaft 52 and a forward edge portion 130 on the opposite side of the shaft. A first spring 132 extends between the first wall portions 112 of the pawl 98 and a post 134 that extends upwardly from the guide plate 50 of the buckle housing 44. The spring 132 urges the pawl member forwardly so that the rearward edge 128 of the opening 126 is in contact with the shaft 52.

A latch release member 136, which is shown best in FIGS. 2 and 5, includes an actuating portion 138 that is bifurcated and defines a first and second leg member 140 and 142. The actuating portion extends in a generally horizontal direction as viewed in FIGS. 2 and 3 and is supported along its length by the guide plate 50 of the buckle housing 44. The legs 140 and 142 of the actuating portion are spaced from one another and, together with the guide plate, form a forwardly extending receptacle 144. Each of the leg members are positioned vertically between the guide plate 50 and the crossmember 100 of the pawl 98. The offset portion 102 of the crossmember is thus positioned within the receptacle 144. Likewise, the leg members 140,142 are also positioned vertically between the guide plate and the latch member 74. The abutment tangs 88 and 92 of the latch member are positioned to engage the leg members 140 and 142 respectively while abutment tang 90 is positioned within the receptacle 144. An upwardly directed projection 146 is formed on each leg member at a forward end 147 thereof in close proximity to the abutment tangs 88 and 92 of latch plate 74. An outwardly extending tab 148 projects from each leg member towards each of the buckle sidewalls 46 and 48. Each tab defines a forward edge 150 and a rearward edge 152. The tabs are received in a third slot 154 in the buckle sidewalls 46 and 48 and they too extend generally in a fore and aft direction as viewed in FIG. 3. The slots also form a corresponding forward and rearward edges 156,158. The slots 154 are larger than the tabs 148 so that the actuating portion 138 of the latch release member 146 may move relative to the buckle housing 44 until contact is made between the respective forward and rearward edges 150 and 152 of tabs 148 and forward and rearward edges 156 and 158 of slot 154. A second spring 160 extends between a pair of lugs 162 that are formed on the actuating portion 138 and the post 134 that extends from the guide plate 50. The spring 160 urges the latch release member in a forward direction so that the edge 150 of the tab 148 is held in contact with the edge 156 of the slot 154.

The latch release member also provides a handle portion 164 that has a relatively large aperture 166 formed therein. The handle portion 164 extends upwardly from the actuating portion and rearwardly away from the buckle housing 44 as viewed in FIGS. 2 and 3. Being so positioned it is in a readily accessible location, away from interference with the buckle housing 44.

Industrial Applicability

When engagement of the seat belt apparatus 12 is desired, the operator, as he sits in the seat, grasps the buckle housing 44 and moves it in a direction toward the second side 16 of the seat assembly or toward the tongue member 32. As the buckle is moved, whatever length of belt that is necessary to span the operator's lap is unrolled from the recoil spool 58. The receptacle 144 formed in the buckle member is then aligned with the tapered surface 36 of the tongue member 32 to allow insertion of the tongue therein.

As the tongue 32 moves into the receptacle 144, it first contacts the abutment tang 90 of the latch member 74. The latch member is raised up against the bias of spring 96 and bears against the upper surface of the tongue as it continues its inward movement. The tongue then contacts the offset portion 102 of the pawl member 98 and the pawl member is also moved rearwardly against the bias of spring 132. The tongue and the pawl will continue to move rearwardly, until the abutment tang 90 of the latch member 74 falls into the aperture 38 of the tongue under the bias of spring 96. The abutment tang engages the wall 40 of the aperture to hold the tongue within the receptacle 144.

At this point, the pawl member 98 has been moved rearwardly enough to bring the bar member 116 into engagement with the teeth 70 on the ratchet wheels 64. This engagement prevents the rotation of the recoil spool 58 in either direction and thus prevents either lengthening or shortening of the effective length of the seat belt apparatus 12. This is significant because, if the belt is allowed to lengthen it would, of course, be rendered ineffective to protect the operator in the event of a mishap. However, it is also prevented from being shortened as a result of "cinching" from the force of the recoil spring. This has been known to cause the operator a great deal of discomfort.

When disengagement of the seat belt apparatus 12 is desired, the operator merely inserts one hand into the aperture 166 of the handle portion 164 of the latch release member 136 and moves it in a direction away from the tongue member 32. Upon this movement, the projections 146 of the leg members 140, 142 are moved into contact with the abutment tangs 88 and 92 of the latch member 74. Continued movement raises the abutment tang 90 upwardly and out of engagement with the aperture wall 40 of the tongue member 32. Continued movement by the operator in the same direction will separate the tongue from the receptacle 144 of the buckle 44. Due to the force applied by spring 132, the pawl member will then be moved instantaneously forward to move the bar 116 out of engagement with the teeth 70 on the recoil spool 58. The spring associated with the recoil spool will then wind the belt around the recoil spool until the buckle resides in its stored position.

It must be noted that the direction of disengagement between the buckle member 44 and the tongue 32 is the same direction that the latch release member 136 must be moved to affect such disengagement. With this arrangement, an operator need only grasp the release handle with one hand and pull in only one direction. This single motion results in the release of the buckle from the tongue as well as the release of pawl member 98 from engagement with the recoil spool 58. Still further, even in frigid climates where arctic mittens must be worn at all times, the aperture 166 in the latch release handle 164 is of sufficient size to allow one handed release of the buckle without removal of the mitten.

Other aspects, objects and advantages of this invention can be obtained from a study of the drawings, the disclosure and the appended claims.

We claim:

1. In a seat belt apparatus adapted for use with a seat assembly having a first belt portion anchored to a first side of the seat assembly and a second belt portion anchored to a second side of the seat assembly, a tongue member associated with a free end of the second belt portion, and a buckle member having a recoil spool mounted therein associated with a free end of the first belt portion in a manner to wind the free end of the first belt portion around the recoil spool, said buckle member having a receptacle defined on one end thereof and being movable toward the tongue member for engagement of said tongue member within said receptacle, the improvement comprising:

a latch member mounted on said buckle member and being positionable for holding the tongue member within the buckle member; and a latch release member having an aperture formed therein and being mounted on the buckle member to extend from an end thereof opposite the end defining said receptacle and being slidably movable in a linear direction away from the tongue member to release the latch member from engagement with the tongue member and to move the buckle member away from the tongue member in a single motion.

2. A seat belt apparatus as set forth in claim 1 wherein a pawl member is mounted on said buckle member to engage the recoil spool and prevent rotation of the recoil spool and thereby fix the effective length of the first belt portion.

3. A seat belt apparatus as set forth in claim 2 wherein the pawl member is urged into engagement with the recoil spool upon the latching engagement of the tongue member within the buckle member.

4. A seat belt apparatus as set forth in claim 1 wherein the free end of the first belt portion is wound around the recoil spool under the bias of a spiral spring to retract substantially the entire length of the first belt within the buckle member when the buckle member is free from engagement with the tongue member.

5. A seat belt apparatus as set forth in claim 1 wherein the latch release member has an aperture formed therein, said aperture being of a size sufficient for receiving a mittened hand of an operator to affect the actuation of the latch release member.

6. In a seat belt apparatus adapted for use with a seat assembly, having a first belt portion having a first end portion anchored to a first side of the seat assembly and a buckle member attached to a second end portion thereof, and a second belt portion having a first end portion anchored to a second side of the seat assembly, and a tongue member attached to a second end portion thereof, said buckle member of the first belt portion being movable in a direction toward the tongue member to achieve latching engagement with said tongue member, the improvement comprising:

a buckle housing having a receptacle defined in a forward portion thereof;

a recoil spool rotatably mounted upon a shaft within the buckle housing and being engaged with the second end portion of the first belt portion;

means for rotatably biasing the recoil spool to wind the second end portion of the first belt portion therearound;

a latch member mounted to said buckle housing and being positionable for holding the tongue member within the receptacle of the buckle housing;

a pawl member slidably mounted within said buckle housing and being movable to a position wherein said pawl member is engageable with the recoil spool to prevent rotation of the recoil spool in response to the insertion of the tongue member into the receptacle; and a latch release member slidably mounted within the buckle housing and being movable in a direction away from the tongue member to release the latch member from engagement with the tongue member and to move the buckle member away from the tongue member in a single motion.

7. A seat belt apparatus as set forth in claim 6 wherein said latch member includes a substantially flat plate having a pair of tab portions formed on opposite sides of said plate, said tab portions being engageable with a first pair of enlarged slots formed in a respective pair of upstanding sidewalls of the buckle housing to capture said latch member for limited movement within the slots between a first position wherein said latch member is in latching engagement with the tongue member to maintain the position thereof when the tongue member is positioned within said receptacle, and a second position wherein the latch member is removed from contact with the tongue member.

8. A seat belt apparatus as set forth in claim 7 wherein a spring member extends between the buckle housing and said latch member to bias the latch member toward said first position.

9. A seat belt apparatus as set forth in claim 7 wherein said pawl member further includes:
   a crossmember having an offset portion formed centrally therealong and being positioned to rest upon a guideplate of the buckle housing in sliding contact therewith;
   a pair of sidewalls having a first portion extending generally perpendicularly to the crossmember and a second portion extending from said first portion at a forwardly extending angle, said sidewalls being spaced from each other and being connected to the crossmember at opposite sides thereof; and
   a bar member having a first and second end portion each of which is positioned within a second slot formed in each upstanding sidewall of the buckle housing, each of said slots opening onto the forward portion of the buckle housing, said bar being captured by the slots for limited fore and aft movement with respect to the buckle housing, said bar being fixedly attached to the second portions of each pawl sidewall.

10. A seat belt apparatus as set forth in claim 9 wherein a generally oblong opening is formed in the sidewalls of the pawl member and being approximately located at the juncture between the first and second portions of said sidewalls, said opening being of a size sufficient to slidably receive the shaft that mounts the recoil spool to said buckle housing and to permit relative fore and aft movement of the pawl member with respect to the shaft.

11. A seat belt apparatus as set forth in claim 9 wherein the pawl member is movable between a first position wherein the bar member is moved into engagement with a plurality of ratchet-like teeth on the recoil spool in response to the insertion of the tongue member into the receptacle of the buckle housing and a second position wherein said bar member is moved out of engagement with the teeth on the recoil spool.

12. A seat belt apparatus as set forth in claim 11 wherein a first spring extends between a post that extends from the guideplate of the buckle housing and each of the sidewalls of the pawl member to urge the pawl member toward the second position.

13. A seat belt apparatus as set forth in claim 7 wherein the latch release member further includes:
   a bifurcated actuating portion having a first and second spaced apart leg member, each leg member having a projection formed on a forward end thereof, said actuating portion being supported by the guideplate of the buckle housing for limited sliding movement with respect thereto between a first and second position; and
   a handle portion having an aperture extending therethrough, said handle being connected to the actuating portion and extending therefrom to a location spaced from the buckle housing.

14. A seat belt apparatus as set forth in claim 13 wherein a tab extends laterally from each of the first and second leg members, said tabs being positioned within a third slot formed in each sidewall of said buckle housing, said third slots being sufficiently larger than said tabs to permit said limited fore and aft movement; and wherein movement of the latch release member in a rearward direction to its first position brings the projections on the actuating portion into engagement with the latch member to move the latch member out of holding engagement with the tongue member.

15. A seat belt apparatus as set forth in claim 13 wherein a second spring extends between a post that extends from the baseplate of the buckle housing and a pair of lugs that extend from the latch release member, said spring urging the latch release member in a forward direction to its second position, out of engagement with the latch member.

16. A seat belt apparatus as set forth in claim 13 wherein said receptacle includes a forwardly opening, U-shaped recess formed by the first and second leg members of the actuating portion of the latch release member and wherein said pawl member is positioned between the first and second leg members of the latch release member with the offset portion of the crossmember in registry with the receptacle.

17. A seat belt apparatus as set forth in claim 13 wherein the aperture in the handle portion of the latch release member is of sufficient size to allow movement of the latch release member to its first position by a mittened hand of an operator.

* * * * *